United States Patent [19]

Ostrowski

[11] Patent Number: 4,923,128

[45] Date of Patent: May 8, 1990

[54] BALE SHREDDING AND DISPENSING DEVICE FOR USE WITH A TRACTOR

[76] Inventor: Erroll B. Ostrowski, Box 102, Major Saskatchewan, Canada, S0L 2H0

[21] Appl. No.: 303,254

[22] Filed: Jan. 30, 1989

[51] Int. Cl.$^5$ .............................................. B02C 18/16
[52] U.S. Cl. ........................... 241/101.7; 241/101 A; 241/280
[58] Field of Search ............. 241/101 A, 101.7, 186.4, 241/277, 280

[56] References Cited

U.S. PATENT DOCUMENTS

| | | |
|---|---|---|
| 2,681,090 | 6/1954 | Hicks et al. . |
| 2,702,131 | 2/1955 | Leupke . |
| 3,084,942 | 4/1963 | Kucera . |
| 3,251,485 | 5/1966 | Fancher . |
| 3,826,436 | 7/1974 | Cetrulo . |
| 3,999,674 | 12/1976 | Meitl . |
| 4,053,071 | 10/1977 | Schrag et al. . |
| 4,060,961 | 12/1977 | Anderson . |
| 4,068,804 | 1/1978 | Butler et al. ..................... 241/101.7 |
| 4,364,526 | 12/1982 | White ................................ 241/186.4 |
| 4,376,607 | 3/1983 | Gibson ......................... 241/101.7 X |
| 4,411,573 | 10/1983 | Townsend .................... 241/101.7 X |
| 4,531,880 | 7/1985 | Paques ......................... 241/101.7 X |

FOREIGN PATENT DOCUMENTS

| 2601551 | 1/1988 | France | ...................... 241/101.7 X |
| 559678 | 7/1977 | U.S.S.R. | ........................ 241/101.7 |

Primary Examiner—Mark Rosenbaum
Attorney, Agent, or Firm—Adrian D. Battison; Stanley G. Ade; Murray E. Thrift

[57] ABSTRACT

A shredder and dispensing device for baled crop materials comprises a frame having coupling arrangements for mounting upon the front end loader linkage of a tractor. The frame carries a horizontal conveyor construction which has an inclined ramp at a forward end so that the ramp can be inserted underneath a bale to slide the ramp and conveyor under the bale to lift the bale onto the conveyor. The conveyor moves the bale toward one side of the device at which a shredder roller is provided with a suitable duct housing to direct the material out to one side of the implement. A deflector can be used to direct the material into feed bunks. The conveyor is mounted on a conveyor frame which can be raised to an inclined angle toward the shredder. The implement enables the handling and shredding of the bale in a simplified manner using a single machine.

13 Claims, 5 Drawing Sheets

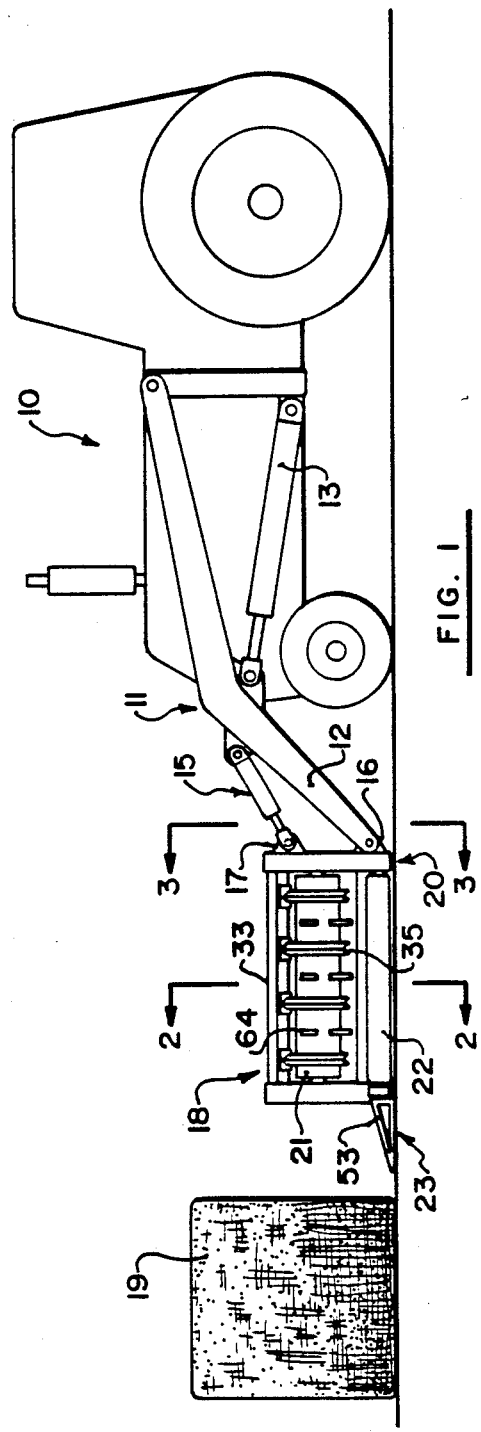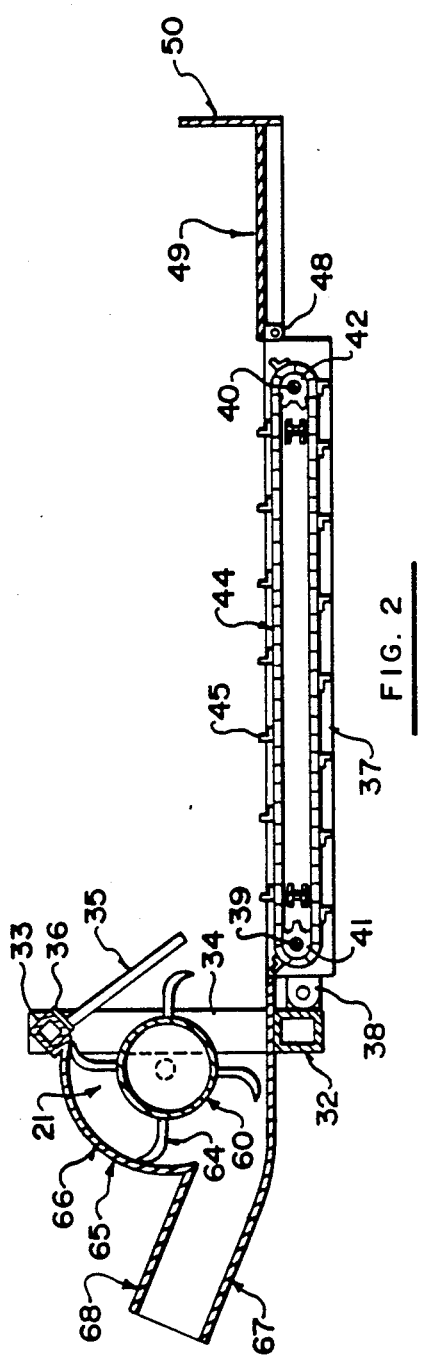

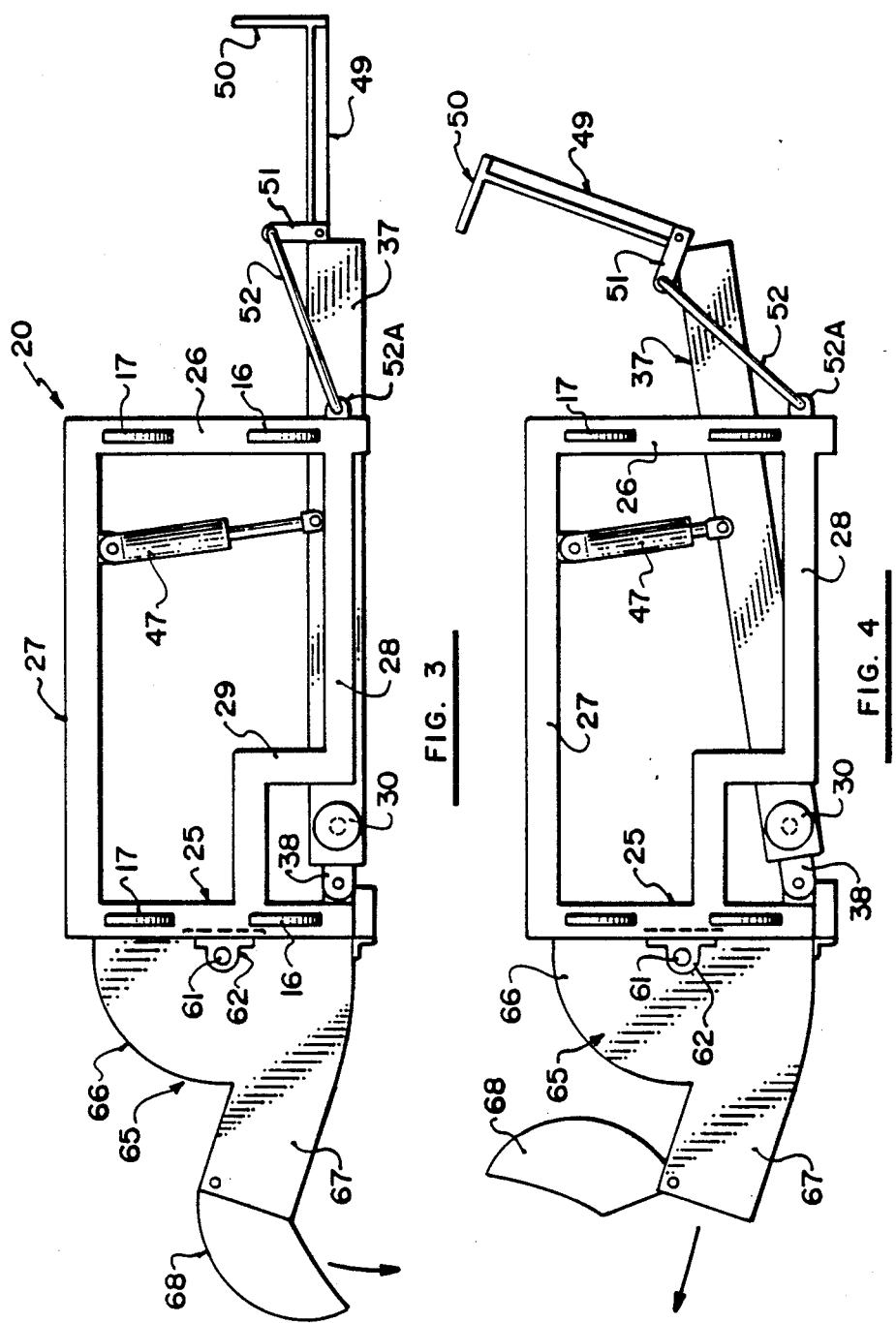

BALE SHREDDING AND DISPENSING DEVICE FOR USE WITH A TRACTOR

BACKGROUND OF THE INVENTION

This invention relates to a bale shredding and dispensing device for use with a tractor.

The handling of harvested crop materials for feed or for bedding in large round bales or in large rectangular bales is now well mechanized with the machines for forming the bales and for transporting and handling the bales readily available and well developed.

Machines for dispensing the feed material or spreading the bedding material are however less well developed and are limited in their operation and handling capabilities. Trailor type vehicles are available which will receive a large round bale and will shred the bale for dispensing. However these trailer type vehicles are difficult to load, expensive to manufacture and are often limited in the size and type of bales which can be handled.

Examples of this type of machine are shown in U.S. Pat. Nos. 3,999,674 (Meitl); 3,084,942 (Kucera); 2,681,090 (Hicks); and 4,053,071 (Sehrag). Further trailer type vehicles for handling crop material are also shown in U.S. Pat. Nos. 2,702,131 (Leupke); 3,826,432 (Cetrulo); and 3,251,485 (Fancher). U.S. Pat. No. 4,060,961 (Anderson) discloses a rotor including flails for shredding crop materials.

SUMMARY OF THE INVENTION

It is one object of the present invention to provide an improved device for shredding and dispensing baled material which simplifies and improves the handling of the bale and enables the bale to be dispensed to different locations.

According to the invention, therefore, there is provided a bale shredding and dispensing device for use with a tractor comprising a frame defining a front, a rear and sides, coupling means on the rear of the frame for attachment of the frame to a front end loader linkage of a tractor, a conveyor arrangement mounted on the frame and defining a substantially horizontal support surface for the bale and arranged to cause movement of the bale on the support surface transversely of the frame toward one side of the frame, and a shredder mounted on the frame at said one side for rotation about an axis extending forwardly of the frame such that the bale as it is carried by the conveyor arrangement toward the shredder is shredded and discharged by the shredder outwardly to said one side.

For the first time, therefore, the present invention provides a device which can be mounted on the front end loader of a tractor. This enables very simple loading of the bales onto the device since the bales can be loaded simply by lowering the front end loader to ground level and then forward movement of the tractor forces the bale onto the conveyor or platform. In addition the mounting of the device on the front end loader allows it be lifted to various heights so that dispensing can be carried out at or adjacent ground level or at an elevated position for loading feeders of different types.

Preferably the device is arranged in dimension so that it can receive either round bales or the large rectangular bales.

Preferably the device includes a deflector arrangement which can be moved to a first position in which the shredded material is dispensed effectively downwardly for collection into a bunk or similar feeder or can be moved to a raised position so that the material is spread widely for bedding.

Preferably both the drive to the shredder and the drive to the conveyor can be provided by hydraulic motors enabling the whole device to be powered directly from the tractor on which it is mounted and for control of the speed of operation to be available to the driver of the tractor.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS:

FIG. 1 is schematic side elevation of the shredding and dispensing device mounted on the front end loader of a tractor.

FIG. 2 is a cross sectional view along the lines 2—2 of FIG. 1.

FIG. 3 is a rear elevational view of the device itself taken along the lines 3—3 of FIG. 1.

FIG. 4 is a rear elevational similar to that of FIG. 3 showing the conveyor in the raised position.

In the drawings like characters of reference indicate corresponding parts in the different figures.

DETAILED DESCRIPTION

Figure 5:
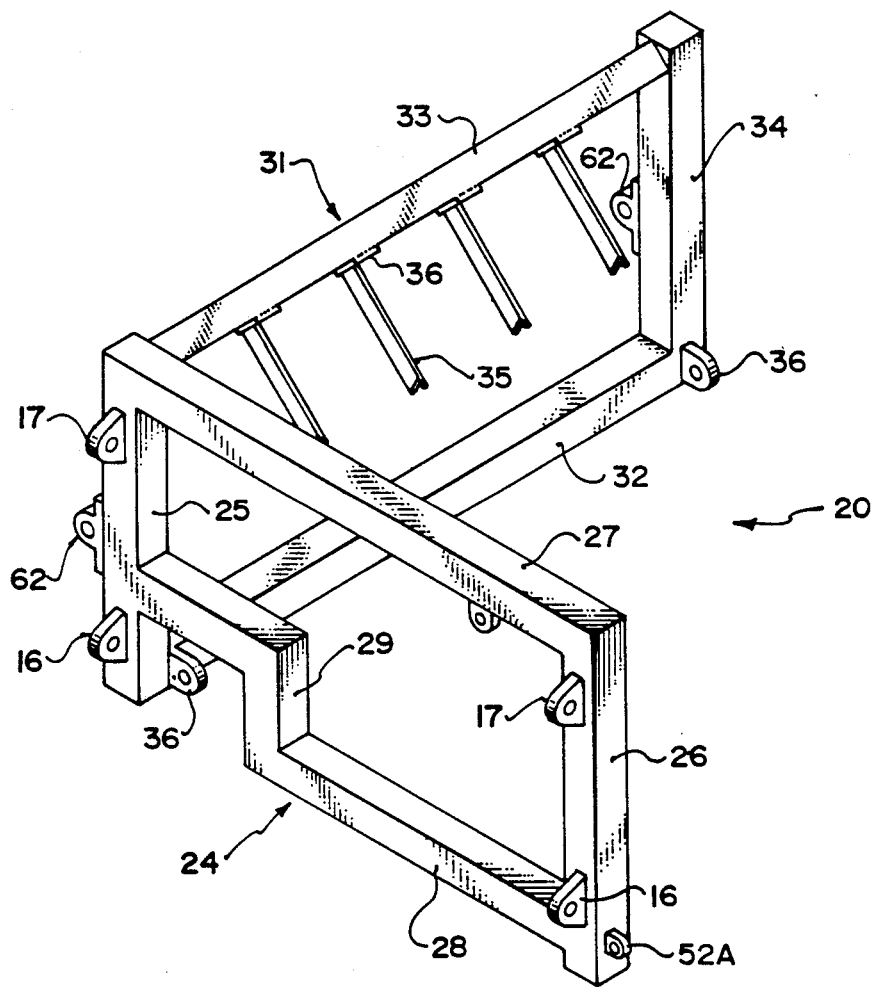
FIG. 5 is an isometric view showing only the main frame of the device of FIG. 1.
Figure 6:
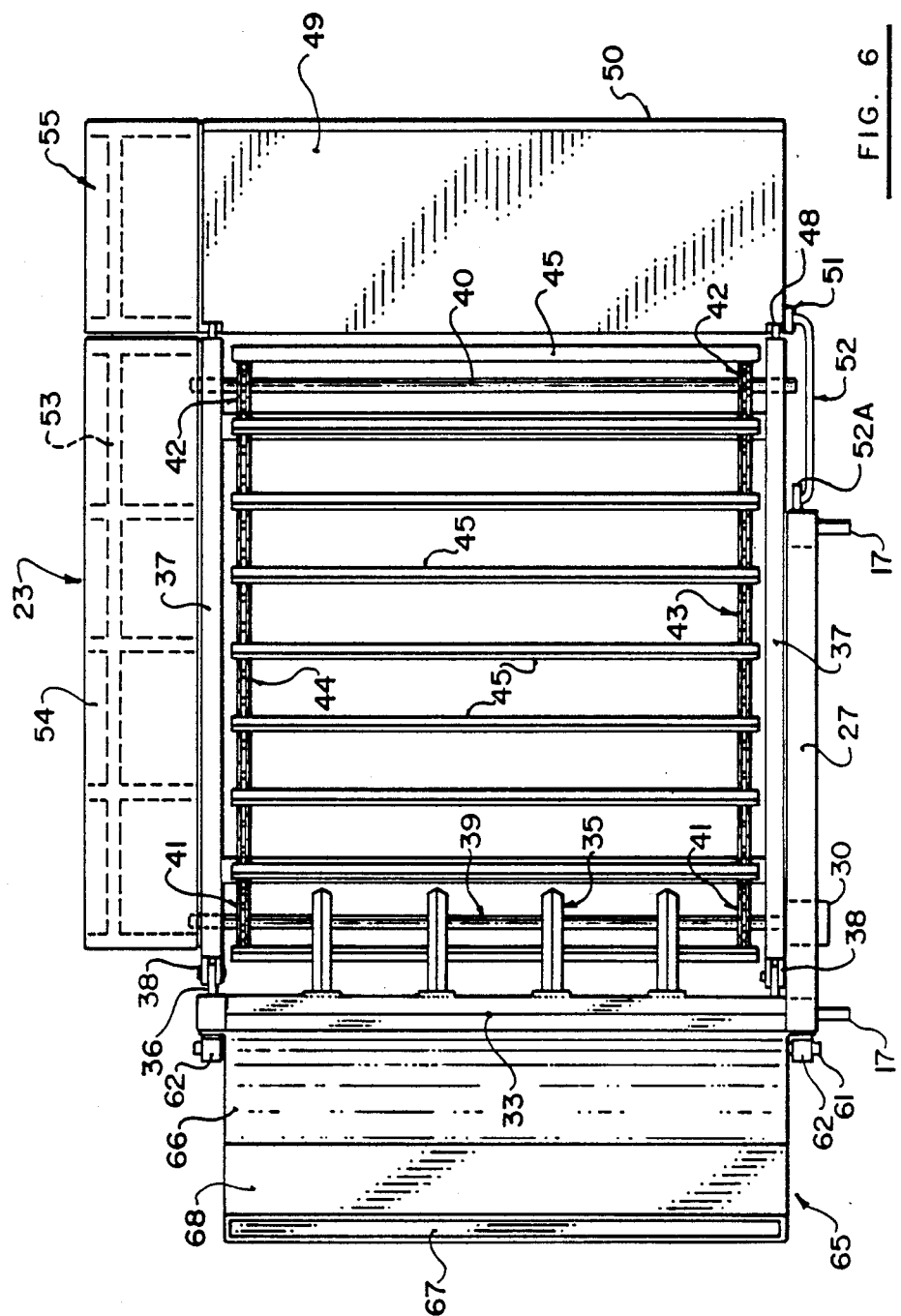
FIG. 6 is a top plan view of the device of FIG. 1.

Turning firstly to FIG. 1 there is illustrated a conventional tractor 10 having a conventional front end loader arrangement 11 defining loader arms 12 which can be raised and lowered by cylinders 13 and also a pivot coupling defined by cylinders 15. Conventionally the lower end of the loader arms 12 is attached to a lug 16 on the rear of an implement such as a loader bucket and the forward end of the cylinders 15 is attached to a similar lug 17 at the upper end of the implement.

The shredding and dispensing device which is the subject of the present invention is indicated generally at 18. A bale is indicated at 19 which is resting on the ground adjacent to the implement for engagement of the implement with the bale for shredding and dispensing as will be described hereinafter.

The implement 18 comprises a frame 20, a shredder roller 21, a conveyor 22 and a ramp 23.

Turning initially to FIGS. 3 and 5, the frame 20 is shown in more detail The frame comprises a rear vertical frame portion 24 defined by a pair of uprights 25 and 26, an upper cross member 27 and a lower cross member 28. On the rear face of the uprights 26 and 27 is provided the pairs of lugs 16 and 17 which cooperate with the front end loader linkage as previously described but not shown in FIGS. 3 and 5 for convenience of illustration. The lower cross member 28 is stepped at 29 to allow access for a drive motor 30 of the conveyor to be described hereinafter.

The frame 20 yet further includes a side frame portion 31 which extends outwardly from a forward face of the upright 25 along one side of the implement. The side frame comprises a lower beam 32 and an upper beam 33 together with a vertical upright 34 parallel to the upright 25. The frame is formed from square tubing which is suitably welded to form a rigid structure on which the operating parts are supported.

The square beam forming the cross member 33 is welded to the upright 25 and 34 after rotation through an angle of 45° as best shown in FIGS. 2 and 5 so that one side face of the beam 33 faces downwardly and outwardly at the 45° angle. A plurality of bars 35 are attached to the side face of the beam by end plates 36 each welded of the bars to hold the bar at right angles to the plate. In this way the bars themselves are directed outwardly and downwardly at the 45° angle so as to form a grate against which the bale is pressed by the conveyor 22 as explained hereinafter. The bars 35 are formed from angle iron with the base of the v shaped thus defined facing upwardly and outwardly toward the bale.

On an inside face of the cross beam 32 and the lower end of the upright 34 is provided a pair of lugs 36 each having a transverse opening to act as a bearing support. The lugs cooperate to support a conveyor frame 37. The conveyor frame 37 includes basically a rectangular frame structure having on a forward end thereof a pair of clevis 38 which cooperate with the lugs 36 to allow pivotal movement of the conveyor frame about a horizontal axis passing through the openings in the lugs 36. The conveyor frame 37 includes a pair of longitudinal beams which support a pair of cross shafts 39, 40 at respective ends thereof The shaft 39 carries a pair of chain wheels 41 adjacent respective ends thereof and the shaft 40 similarly carries a pair of chain wheels 42 aligned with the chain wheels 41 for supporting chains 43 and 44. The chains support a plurality of transverse slats 45 in the form of angle irons welded to respected links of the chain so that the slats are spaced along the length of the chain and extend across between the chains generally parallel to each other and at right angles to the length of the chains.

The conveyor frame 37 carrying the chains and slats as shown in FIG. 3, in an initial position, lies substantially horizontal. The conveyor frame can however be raised to the position shown in FIG. 4 by actuation of a cylinder 47 to the position shown in FIG. 4. This angle of inclination assists in moving the bale on the conveyor in the direction toward the shredder.

The end of each of the longitudinal beams of the conveyor frame carries a lug 48° which pivotally supports an extension plate 49 which extends out in the lowered position of the conveyor frame in a horizontal direction beyond the end of the conveyor frame to define an additional support surface for the bale. An end of the plate remote from the conveyor includes an upright end plate 50 for confining the bale within the length of the conveyor with the extension piece. The extension piece carries a lever 51 which is pivotally connected to a tie rod 52 the other end of which is connected to a lug 53 on the side of the upright 26. The action of the lever 51 and the tie rod 52 is to pivot the extension piece 49 relative to the conveyor frame as the conveyor frame is raised to the elevated position shown in FIG. 4. This again acts to move the bale material along the conveyor toward the shredder when the raising action takes place.

Welded to a forward side of the forward longitudinal strut of the conveyor frame is a ramp frame 52A formed by a plurality of struts defining the triangular shaped ramp structure 23. The frame ia covered by a suitable skin 54 to define a ramp of sufficient stiffness that it can be inserted under the bale and forced forwardly under the bale to move the bale upwardly onto the conveyor surface. The extension piece 49 also includes a ramp portion 55 aligned with the ramp 23 so that the whole of the platform including the conveyor and the extension piece can be inserted under the bale to lift the bale to the required location.

The shredder 21 comprises a roller 60 mounted on a shaft 61 carried in a pair of pillow blocks 62 mounted on the uprights 25 and 34 of the frame. The pillar blocks are mounted on the outer side face of the uprights at a position approximate to the mid height thereof. The roller 60 carries a plurality of flails 64 which engage between the grate bars 35 to shred the bale pressed against the grate bars by the conveyor arrangement. The roller and flails are of a conventional construction and accordingly are not described in detail here.

The roller and flails defining the shredder are mounted within a shroud 65 defined by a part cylindrical portion 66 and a chute portion 67. The chute portion 67 commences at a tangent to the roller and flail assembly adjacent the bottom of the frame and then is inclined slightly upwardly at an angle of the order of 25°. An extension piece of the cylindrical portion 66 is indicated at 68 and cooperates with the lower pan portion of the shroud to form the duct 67. A deflector surface 68 is provided which has a curved upper surface contiguous with the upper surface of the duct so as to turn the material exiting the duct in a downward direction for deposit into a suitable container directly beneath the end of the duct. The deflector 68 can be turned to a raised position as shown in FIG. 4 to allow the material shredded from the bale to be ejected directly out of the duct 67 in a spreading action.

The implement can therefore be used with the bale mounted on the conveyor arrangement for shredding the bale for a wide spreading action to provide bedding of a straw material Alternatively the deflector can be used to direct feed material into longitudinal bunks while the implement is moved on the track to longitudinally along the bunks. In addition the implement can be raised on the front end loader arrangement to a required height to deposit material into other types of feeder arrangements. Thus the deposit from the discharge of the shredder can be arranged at any suitable height simply by lifting the implement on the front end loader arrangement. Furthermore the loading of the device requires merely the single operator and the single machine provided by the tractor and implement combination.

Figure 7:
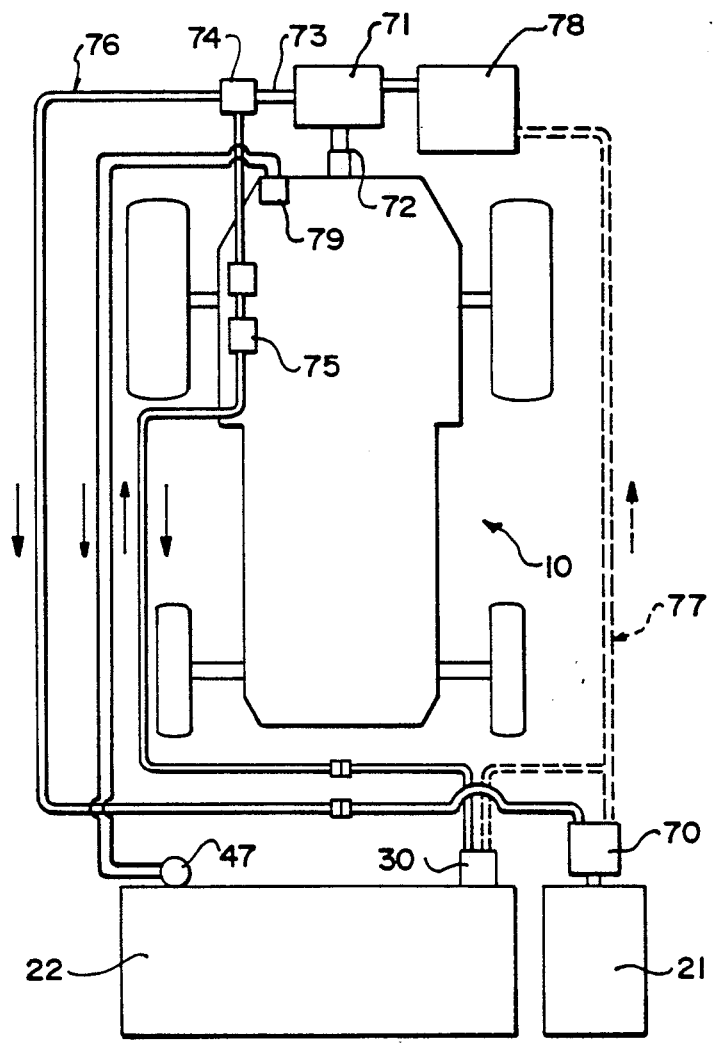
FIG. 7 is a schematic view of the device of FIG. 1 showing the hydraulic circuit and motor drive for the device.

In FIG. 7 is illustrated schematically a drive system for the shredder roller 21 and for the conveyor arrangement 22. The conveyor is driven by the motor 30 previously shown in FIG. 3 which is mounted on the side of the conveyor frame and connects with the shaft 39. The shredder 21 is driven by a motor 70 mounted on the upright 25.

A pump 71 is driven by the PTO shaft 72 of the tractor and generates a high pressure oil stream 73. A splitter 74 divides a portion of the oil stream for driving the motor 30 for a controlled valve system 75 mounted within the tractor cab. The main oil flow passes through a duct 76 to the motor 70. A return pipe 77 is provided for returning the oil supply to a reservoir 78. The cylinder 47 is driven by the conventional tractor hydraulics indicated at 79. As an alternative the motor 30 can be driven by the tractor hydraulics directly while the larger horsepower requirement of the shredder 21 is driven by the PTO pump 71.

I claim:

1. A bale shredding and dispensing device comprising at tractor vehicle having a front end loader linkage, a frame defining a front, a rear and sides, coupling means on the rear of the frame mounting the frame on the front end loader linkage of the tractor, a single horizontal feed conveyor arrangement mounted on the frame and comprising a pair of rollers each mounted adjacent a respective side of the frame and a conveyor element defining an upper surface for the frame and driven by the rollers in a direction across the frame from one side roller to the other side roller, the rollers and element extending from the front to the rear of the frame so as to define a substantially horizontal support surface for the bale and arranged to cause movement of the bale on the support surface transversely of the frame toward one side of the frame, a shredder member mounted on the frame at said one side for rotation about a horizontal axis extending forwardly of the frame, the shredder member extending from the front to the rear of the frame such that the bale as it is carried by the conveyor arrangement toward the shredder is shredded and discharged by the shredder outwardly to said one side, an inclined ramp surface stationary relative to the frame mounted on the frame at the front and having a forward edge for engaging under a stationary bale engaged by forward movement of the tractor vehicle and a rearward edge at a raised position relative to the forward end adjacent said upper surface of the conveyor element and a duct surface at least partly surrounding the rotatable shredder member and defining a guide duct extending upwardly and outwardly from said one side such that the shredder acts to discharge the shredded material through the guide duct in an upward and outward direction for spreading, the guide duct including a further guide surface for redirecting the material in a downward direction for collection at a localized position adjacent an outer end of the guide duct, the guide surface being movable to an inoperative position for allowing upward discharge of the material.

2. The invention according to claim 1 wherein the conveyor element comprises a pair of endless chains with one of the chains arranged at a forward end of the conveyor arrangement and the other of the chains arranged rearward end of the conveyor arrangement and a plurality of slats carried by the chains such that the slats are driven in said transverse movement to carry the bale toward the shredder.

3. The invention according to claim 1 wherein the shredder comprises a roller rotatable about a longitudinal axis of the roller and a plurality of flails carried by the roller for engaging an adjacent surface of the bale.

4. The invention according to claim 3 including a grate defined by a plurality of elongate bars extending in a direction generally tangential to the axis of the shredder.

5. The invention according to claim 1 wherein the conveyor is mounted upon a conveyor frame extending from said one side toward the other side, the conveyor frame being pivotal about an axis parallel to the axis of the shredder at a position adjacent the shredder such that end of the conveyor frame remote from the shredder can be lifted to incline an upper surface of the conveyor on which the bale sits downwardly toward the shredder.

6. The invention according to claim 1 including a substantially flat extension plate extending outwardly from an upper surface of the conveyor arrangement at the end thereof remote from the shredder.

7. The invention according to claim 1 wherein the conveyor is mounted upon a conveyor frame extending from said one side toward the other side, the conveyor frame being pivotal about an axis parallel to the axis of the shredder at a position adjacent the shredder such that an end of the conveyor frame remote from the shredder can be lifted to incline an upper surface of the conveyor on which the bale sits downwardly toward the shredder, wherein a substantially flat extension plate extends outwardly from an upper surface of the conveyor arrangement at the end thereof remote from the shredder and wherein there is provided means mounting the extension plate on the conveyor frame such that lifting movement of the conveyor frame causes the extension plate to fold inwardly relative to the conveyor frame to a retracted position thereof.

8. The invention according to claim 1 wherein the frame comprises a vertical frame portion at the rear end thereof defined by a pair of spaced vertical struts having thereon said coupling means, and a further frame portion extending forwardly from the vertical frame portion at said one side thereof, said further frame portion providing a support for the shredder.

9. The invention according to claim 1 wherein the frame comprises a vertical frame portion at the rear end thereof defined by pair of spaced vertical struts having thereon said coupling means, and a further frame portion extending forwardly from the vertical frame portion at said one side thereof, said further frame portion providing a support for the shredder, and wherein the conveyor is mounted upon a conveyor frame extending from said one side toward the other side, the conveyor frame being mounted on said further frame portion for pivotal movement about an axis parallel to the axis of the shredder such that an end of the conveyor frame remote from the further frame portion can be lifted to incline an upper surface of the conveyor on which the bale sits downwardly toward the shredder.

10. The invention according to claim 1 wherein the frame comprises a vertical frame portion at the rear end thereof defined by a pair of spaced vertical struts having thereon said coupling means, and a further frame portion extending forwardly from the vertical frame portion at said one side thereof, said further frame portion providing a support for the shredder, and a grate comprising a plurality of elongate bars mounted on said further frame portion and extending outwardly and downwardly therefrom into contact with the bale.

11. The invention according to claim 10 wherein the further frame portion includes a square tubular beam welded onto said further frame portion at an angle such that the bars of the grate are attached to one side of the beam and extend downwardly and outwardly therefrom in a direction relative to a vertical plane containing the beam.

12. The invention according to claim 11 wherein the conveyor includes means for coupling a hydraulic motor thereof to a hydraulic system of the tractor and wherein there is provided means for driving a hydraulic motor of the shredder from a pump of the PTO.

13. The invention according to claim 1 including a hydraulic pump for attachment to a PTO shaft of tractor and hydraulic motors for driving the conveyor arrangement and the shredder.

* * * * *